Sept. 5, 1961     K. W. THOMPSON     2,998,733

CONTROL DEVICE

Filed June 2, 1959

*INVENTOR.*
KENNETH W. THOMPSON

BY

*Harry M. Saragovitz*

ATTORNEY

2,998,733
CONTROL DEVICE
Kenneth W. Thompson, Red Bank, N.J., assignor to the United States of America as represented by the Secretary of the Army
Filed June 2, 1959, Ser. No. 817,695
2 Claims. (Cl. 74—553)
(Granted under Title 35, U.S. Code (1952), sec. 266)

The invention described herein may be manufactured and used by or for the Government for governmental purposes, without the payment of any royalty thereon.

In the operation of many electronic equipments, the need arises for a control device that will provide a definite number of turns in shafts that control such items as multi-turn rheostats and potentiometers included in said electronic equipments.

The present invention relates to a control device characterized by means whereby the shaft, to which the control device is secured, can only be rotated an adjustably fixed number of turns in either clockwise or counterclockwise direction.

In the past various methods have been suggested and used for limiting the rotational movement of a shaft. Usually such devices were separate and spaced from the shaft or from the knob controlling the movement of the shaft. It is obvious that such forms of stops were space consuming, and in areas and applications where size might be a critical factor such usages could be objectionable.

The primary object of the present invention is to provide a means for limiting the rotational movement of a shaft wherein said means is integral with and incorporated within a knob which controls movement of the shaft.

An important feature of the invention resides in the provision of means which include an adjusting nut and a lock nut to vary a whole number or any fractional number of turns of the shaft as may be required within a certain range.

The invention can best be understood from the following description to be read in view of the accompanying drawing in which.

Figure 1:
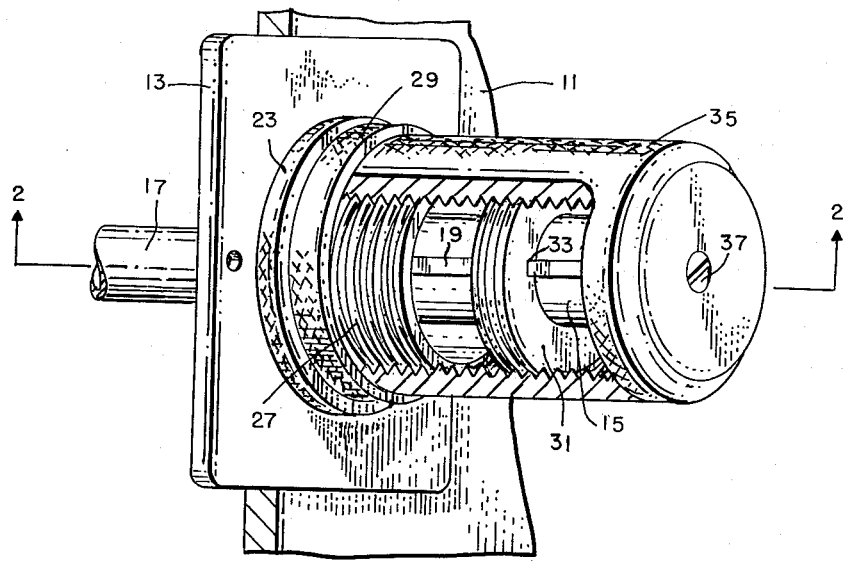
FIG. 1 is a view in perspective, and partly broken away, showing the improved knob of this invention.
Figure 2:
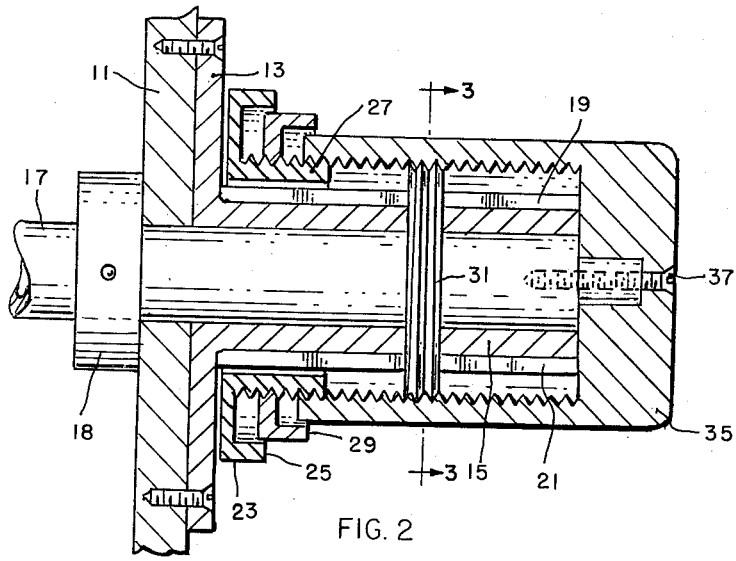
FIG. 2 is a cross section of the knob shown in FIG. 1, taken along the line 2—2 thereof.
Figure 3:
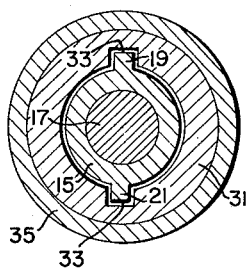
FIG. 3 is a cross section of the knob shown in FIG. 2, taken along line 3—3 thereof.

Referring to the drawing there is shown a preferred embodiment of the invention in FIG. 1 wherein there is shown a panel 11 beyond which lies the component to be controlled by the knob of this invention. Affixed to the panel 11 is a mounting 13 including an axially extending tubular shank portion 15 through which a shaft 17 extends and is held by collar 18. The shaft 17 extends through the panel 11, as shown, and is the shaft whose sweep of rotational movement is to be controlled and limited as hereinafter described. Affixed to shank 15 are a pair of keys 19, 21, which are axially aligned and diametrically opposed on the surface of the shank 15, and the function of which will be hereinafter set forth. Freely rotatable on the shank portion 15, there is positioned an adjusting nut 23 having a shoulder portion 25 and an elongated shank provided with an external threaded portion 27. Engageable on the threads 27 is a lock nut 29 internally threaded as shown which engages the threads 27 of nut 23, and having a diameter substantially equal to the inner diameter of the adjusting nut 23.

An externally threaded traverse slug 31 is provided for sliding engagement along the shank portion 15. The slug 31 is characterized by having a pair of diametrically opposed keyways 33 that mesh with the keys 19, 21, in its movement of travel. Completing the assembly of the control device of the present invention is a knurled knob 35 provided with an internal threaded surface which threadably engages the traverse slug 31 and the threads of the adjusting nut 23. The knob 35 is secured to the shaft 17 by screw 37 whereby rotation of the knob in either direction will be imparted to the shaft.

The manner in which the above described embodiment operates can be briefly described as follows. With the shaft 17 secured to any desired electronic equipment, the rotation of the knob 35 will be imparted to the shaft. As the knob is being rotated, the traverse slug 31 being in threadable engagement with the knob will slide along the shank 15 of the mounting. No rotational movement of the slug 31 will be effected since it is keyed to the shank 15 in the manner described above. The number of rotational turns that the knob 35 can travel through will be determined by the travel of the slug 31, it being obvious that no further rotation can be accomplished when the slug reaches its end of travel when the slug reaches either the inner face of the knob or is stopped by the portion 27 of the adjusting nut 23.

To reduce or increase the linear length of screw threads of the shank portion 15, thereby permitting fewer or more rotations of the knob, all that need be done is to locate the adjusting nut 23 to any desired position. In cooperation with the locking nut 29 any desired linear length can be adjustably made, even to the extent of permitting a whole number plus any fractional increment of a turn of the knob as desired.

Having thus described the invention, what is claimed as new is:

1. Means for controlling the rotational movement of a shaft through a predetermined number of rotations in either direction comprising a fixed elongated tubular shank portion, having axially aligned diametrically opposed external keys thereon, serving as a housing for said shaft, a hollow internally threaded knob encompassing said shank portion and engageable with said shaft for mutual rotation therewith, an independent externally threaded traverse slug including discrete first and second opposing flat end portions and having discrete diametrically opposed internal keyways, each of said keyways being in slidable engagement with the discrete keys on said tubular shank portion, said slug being engageable with the threads of said knob and slidable through a determinate linear sweep along said shank portion, means in direct opposing relationship with said first flat end portion of said slug for stopping the movement of said slug in one longitudinal direction, and means, in direct opposing relationship with said second flat end of said slug, comprising the inner end wall of said knob for stopping the movement of said slug in the other direction whereby the number of turns to which said knob can be rotated is limited by the linear sweep of said slug along the keys of said tubular shank portion.

2. Means for controlling the rotational movement of a shaft through a predetermined number of rotations in either direction comprising a fixed elongated tubular shank having at least one elongated axially disposed key on its surface and serving as a housing for said shaft, a hollow internally threaded knob encompassing said shank portion and affixed to said shaft for mutual rotation therewith, an independent externally threaded traverse slug including discrete opposing flat end portions engageable with the threads of said knob and having a keyway that meshes with the key on said shank portion and slidable through a determinate linear sweep thereon, and means in direct opposing relationship with said discrete flat end portions of said slug for limiting the movement of travel of said slug whereby the number of turns to which said knob and shaft can be rotated is limited by the linear sweep of said slug.

References Cited in the file of this patent

UNITED STATES PATENTS

| | | |
|---|---|---|
| 21,510 | MacDonald | Sept. 14, 1858 |
| 528,211 | Sedgwick | Oct. 30, 1894 |
| 2,502,573 | Lee | Apr. 4, 1950 |
| 2,563,702 | Benford | Aug. 7, 1951 |
| 2,590,745 | Wuensch | Mar. 25, 1952 |
| 2,755,682 | Boyd | July 24, 1956 |
| 2,800,806 | Sangster | July 30, 1957 |

FOREIGN PATENTS

| | | |
|---|---|---|
| 559,809 | Canada | July 1, 1958 |
| 630,555 | France | Aug. 23, 1927 |
| 774,020 | Great Britain | May 1, 1957 |